Magne Skeisvoll
INVENTOR.

2,789,458
Patented Apr. 23, 1957

2,789,458
WEDGE ACTUATED QUICK ACTING NUT
Magne Skeisvoll, Hudson Heights, N. J.

Application April 19, 1954, Serial No. 424,036

1 Claim. (Cl. 85—33)

This is a continuation in part of my application, Serial No. 290,429, filed May 28, 1952, and now abandoned, and relates to improvements in quick acting nuts and specifically it refers to a nut of a novel design for use with drilling machines and the like where quick changes are necessary.

The main object of my invention is to furnish a quick acting nut of simple construction, which will securely fasten an article and which will make it possible to quickly unfasten same.

Another object of my invention is to provide a quick acting nut which may be used as a lock nut in adjusting a stop limiting the travel of a machine, such as a drilling machine or a hand screw machine.

Other objects and advantages of this invention will be apparent during the course of the following description and claim.

Figure 1:
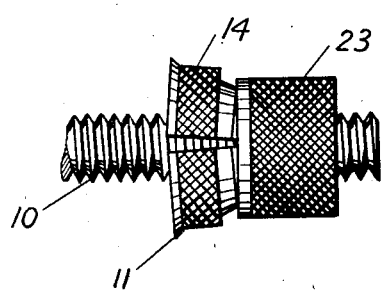
Figure 3:
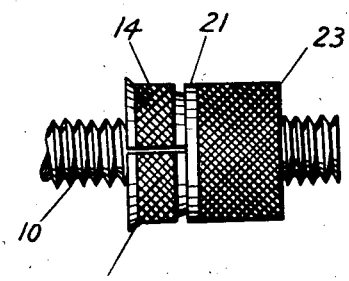
Figure 2:
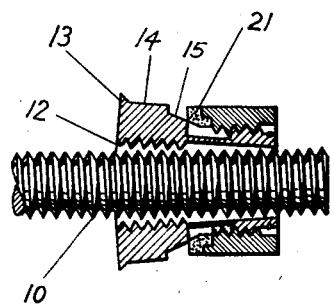
Figure 4:
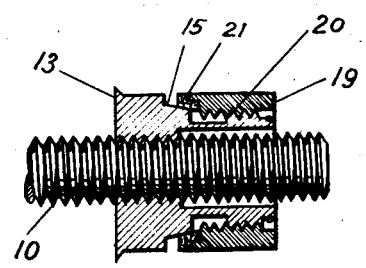
Figure 5:
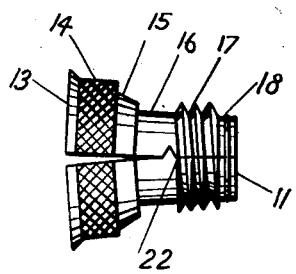
Figure 6:
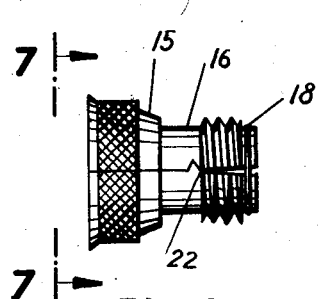
Figure 7:
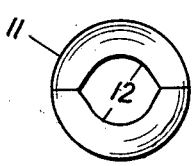

In the accompanying drawings, forming a part of this application, and in which like numerals designate like parts throughout the same, Figure 1 is a side elevation of a quick acting nut in the open position embodying my invention, Figure 2 is a section through the nut in Figure 1 and also it shows same in the open position, Figure 3 represents a side elevation of the same nut in the closed position, Figure 4 is a section through the same nut in its closed position, Figures 5 and 6 represent side elevations of the inner part of a nut, in Figure 5 the nut is shown in the open position and in Figure 6 in a closed position, and, Figure 7 is an elevation taken along line 7—7 in Figure 6.

In the drawing, wherein for the purpose of illustration, there is shown a preferred improvement of my invention, numeral 10 designates a bolt or threaded rod upon which the threaded nut 11 is free to run. The inner nut 11 has an internal thread 12 at one end, see Figure 2, and it has furthermore an enlarged plane surface 13 at one end with a knurled portion 14 which may be gripped when operating the nut. Nut 11 also has a conical shoulder 15, see Figures 2 and 5, and a neck 16 which carries an external thread 17 at the other end. A wire spring 18 fitting in a groove in the end of nut 11 holds the same in the open position as shown in Figure 5.

The nut 11 consists of 2 halves which, as mentioned supra, are held together by the spring 18. When the outer nut 19 is removed, the entire nut will take the open position as shown in Figure 5. The 2 halves rock over the point 22 which becomes a fulcrum around which the 2 parts move. This fulcrum is made in a form of a raised wedge shaped member on one half fitting into a corresponding groove on the other half.

The outer nut 19 having an internal thread 20 fitting the external thread 17 of the inner nut 11 is placed over said inner nut from one end. The nut 19 has a conical shoulder 21, see Figures 2 and 4, which fits over shoulder 15 of the inner nut 11. The shoulder 21 of nut 19 is in frictional engagement with shoulder 15 of the inner nut.

To avoid freezing of nut 19, I find it desirable to make the end of same with shoulder 21 from a different material, such as brass, or other suitable material having the desired friction characteristics.

The nut 19 also has a knurled portion 23 which is useful when tightening the nut hard. The nut 19 is otherwise made of one piece except for the shoulder 21 as mentioned above and it may be made from steel or any other suitable material.

The operation of my invention is as follows: The outer nut 19 is placed over the end of the inner nut 11 until the thread 20 of nut 19 engages the thread 17 of nut 11. The outer nut 19 is then turned on to thread 17 until the shoulder 21 meets shoulder 15. In this position the assembled nut is in the open position as shown in Figures 1, 2 and 5. When it is desired to close the nut, it is only necessary to grip the knurled portion 14 of the inner nut with one hand and the kurled portion 23 of the outer nut with the other hand and turning both nuts in an opposite direction until shoulder 21 enters over shoulder 15 of the inner nut. In so doing the conical surface of the shoulder 21 will slide over shoulder 15 of the inner nut and will force same together by turning on fulcrum 22 and by simultaneously stretching spring 18. As the nut 19 is turned farther over threads 17 the shoulder 21 will force the threaded portion of the inner nut 11 together until the threads 12 of same engage the screw threads of the bolt 10. The nut may now be used as an ordinary nut or as a lock nut for various purposes as mentioned above. This nut has the advantage of being capable of locking itself without a second nut, just by turning the outer nut 19 until the 2 halves of the inner nut 11 are pressed tightly against the screw threads of the threaded rod 10. When it is desired to move the nut, it is only necessary to unscrew the outer nut 19 whereupon the 2 halves of the inner nut 11 will turn on fulcrum 22 by the force of the spring 18 and will open and disengage from the thread of the bolt 10. The nut may then be quickly moved by sliding up or down the rod 10.

It is to be understood that a form of my invention, herewith shown and described, is to be taken as a preferred example of same, and that various changes in shape, size and arrangement of parts may be resorted to without departing from the spirit of my invention, or the scope of the sub-joined claim.

Having thus described my invention, I claim:

A quick acting nut comprising an inner nut having two equal halves split along the longitudinal axis, said nut having an internal thread at one end and having a fulcrum between said two halves, near the middle, said halves furthermore having an outer knurled portion followed by a conical shoulder followed by a neck extending to a threaded portion having an external thread past said fulcrum, said halves also having an external annular groove at the opposite end from said internal threaded portion; a circular wire spring placed in said annular groove, said spring holding said halves together by a contracting force; a second outer nut having an internal thread fitting over said external thread of said inner nut, and an annular ring of different material such as brass pressed into one end of said second nut, said annular ring having a concave conical shoulder fitting over said conical shoulder of said inner nut.

References Cited in the file of this patent
UNITED STATES PATENTS

| | | |
|---|---|---|
| 351,474 | Stevens et al. | Oct. 26, 1886 |
| 642,170 | Starrett | Jan. 30, 1900 |
| 1,376,296 | Snow | Apr. 26, 1921 |
| 1,652,169 | Fleming | Dec. 13, 1927 |
| 2,388,179 | Prowd | Oct. 30, 1945 |